(12) United States Patent
Hwang et al.

(10) Patent No.: US 7,808,582 B2
(45) Date of Patent: Oct. 5, 2010

(54) ILLUMINATING APPARATUS WHEREIN THE PLURALITY OF POLARIZATION SEPARATING LAYERS ARE DISPOSED ONLY TO FACE THE PLURALITY OF REFLECTIVE PATTERNS OF THE POLARIZATION LIGHT GUIDE PLATE UNIT

(75) Inventors: Seong-mo Hwang, Yongin-si (KR); Jae-ho You, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 802 days.

(21) Appl. No.: 11/647,171

(22) Filed: Dec. 29, 2006

(65) Prior Publication Data

US 2007/0263139 A1    Nov. 15, 2007

(30) Foreign Application Priority Data

May 11, 2006    (KR)    ...................... 10-2006-0042384

(51) Int. Cl.
*G02B 27/28* (2006.01)
*F21V 7/04* (2006.01)
*G02F 1/1335* (2006.01)

(52) U.S. Cl. .................. 349/95; 359/487; 359/488; 362/616; 362/619; 362/620; 349/64; 349/115

(58) Field of Classification Search ................ 359/487, 359/488; 362/619, 620, 616; 349/115, 64, 349/95
See application file for complete search history.

(56) References Cited

U.S. PATENT DOCUMENTS

| | | | |
|---|---|---|---|
| 3,415,012 A | 12/1968 | Stubbmann | |
| 5,060,420 A | 10/1991 | Bergman | |
| 5,587,816 A * | 12/1996 | Gunjima et al. | ............... 349/62 |
| 6,239,851 B1 | 5/2001 | Hatazawa et al. | |
| 6,643,978 B2 | 11/2003 | Price | |
| 6,644,824 B2 | 11/2003 | Baba | |
| 2001/0026335 A1 * | 10/2001 | Moon | ........................... 349/63 |
| 2003/0107689 A1 | 6/2003 | Park et al. | |
| 2003/0137617 A1 * | 7/2003 | Cornelissen et al. | .......... 349/63 |
| 2004/0207778 A1 | 10/2004 | Yoon | |
| 2005/0062915 A1 | 3/2005 | Son et al. | |
| 2006/0279672 A1 | 12/2006 | Kim et al. | |
| 2007/0047259 A1 | 3/2007 | Lee et al. | |
| 2007/0132915 A1 | 6/2007 | Mi | |
| 2007/0247872 A1 | 10/2007 | Lee et al. | |

(Continued)

FOREIGN PATENT DOCUMENTS

KR    10-2003-0065844 A    8/2003

(Continued)

*Primary Examiner*—Andrew Schechter
*Assistant Examiner*—Dennis Y Kim
(74) *Attorney, Agent, or Firm*—Sughrue Mion, PLLC

(57) ABSTRACT

An illuminating apparatus providing polarized color light and a display apparatus including the illuminating apparatus are provided. The illuminating apparatus includes a light source; a polarization light guide plate (LGP) unit which converts a polarization direction of light emitted from the light source into linearly polarized light, and collimates the linearly polarized light; and a cholesteric liquid crystal color filter which disposed on an upper portion of the polarization LGP unit, and selectively reflects light according to a polarized status and a wavelength of the light.

21 Claims, 10 Drawing Sheets

U.S. PATENT DOCUMENTS

| | | |
|---|---|---|
| 2007/0252923 A1 | 11/2007 | Hwang et al. |
| 2007/0263139 A1 | 11/2007 | Hwang et al. |
| 2008/0186738 A1 | 8/2008 | Kim et al. |
| 2008/0252816 A1 | 10/2008 | Hwang et al. |

FOREIGN PATENT DOCUMENTS

| | | | |
|---|---|---|---|
| WO | WO 9722834 A1 | * | 6/1997 |
| WO | 03/002908 A1 | | 1/2003 |

* cited by examiner

ILLUMINATING APPARATUS WHEREIN THE PLURALITY OF POLARIZATION SEPARATING LAYERS ARE DISPOSED ONLY TO FACE THE PLURALITY OF REFLECTIVE PATTERNS OF THE POLARIZATION LIGHT GUIDE PLATE UNIT

CROSS-REFERENCE TO RELATED PATENT APPLICATIONS

This application claims the benefit of Korean Patent Application No. 10-2006-0042384, filed on May 11, 2006, in the Korean Intellectual Property Office, the disclosure of which is incorporated herein in its entirety by reference.

BACKGROUND OF THE INVENTION

1. Field of the Invention

Apparatuses consistent with the present invention relate to an illuminating apparatus for a flat panel display apparatus, and more particularly, an illuminating apparatus with improved optical efficiency and color purity characteristics including a polarized LGP (LGP) unit having improved polarization performance and providing vertically output light, and a cholesteric liquid crystal filter, and a display apparatus including the illuminating apparatus.

2. Description of the Related Art

Liquid crystal displays (LCDs), which are widely used as flat panel display apparatuses, are non-emissive devices that have liquid crystal injected between an array substrate, including a thin film transistor, and a color filter substrate in order to obtain imaging effects due to a difference between refractive indexes according to an anisotropy of the liquid crystal. Therefore, LCDs require an additional light source, for example, an illuminating apparatus such as a backlight unit.

However, currently used LCDs use only 5% of the light emitted from the light source to display images. The low optical efficiency is caused by light absorption of a polarization plate and a color filter included in the LCD. The LCD is fabricated by disposing two facing substrates on which electric field generating electrodes are respectively formed, and between which liquid crystal is injected. In addition, liquid crystal molecules move due to the electric field generated by applying voltages to the electrodes, and thus, light transmittance varies according to the status of the liquid crystal molecules. That is, the LCD performs as a shutter that transmits or blocks light by changing a polarization direction of the transmitting light, and thus, the LCD uses linearly polarized light in one direction and includes polarization plates on both surfaces of the LCD. The polarization plate disposed on both surfaces of the LCD is an absorptive polarization plate that transmits light polarized in one direction and absorbs light polarized in another direction. The absorbing of about 50% of incident light by the polarization plate is the largest factor in low light utilization efficiency of the LCD.

In addition, the LCD requires a color filter including the three primary colors of red (R), green (G), and blue (B) in order to display full-color images. In addition, the color filter is formed using dyes or pigments. An absorptive color filter only transmits light corresponding to a transmission band from among the incident RGB light, and absorbs the remaining ⅔ of the light, and thus, causes a decrease in optical utilizing efficiency.

In order to solve the above problem, extensive research is being conducted to increase optical efficiency by substituting another element for the absorptive polarization plate or changing the polarization direction of light incident onto the absorptive polarization plate into the same polarization direction as that of a rear polarization plate. For example, a reflective polarization film having a multi-layered structure such as a dual brightness enhancement film (DBEF) can be attached on an upper surface of a polarization LGP in order to improve the optical utilizing efficiency of the LCD. However, the reflective polarization film is costly, and lacks a polarization changing unit, and thus, limits an increase of the optical utilizing efficiency. Therefore, extensive research is being conducted to develop a polarization LGP that can separate and change the polarization direction of light as required.

In addition, cholesteric liquid crystal color filters using cholesteric liquid crystal that selectively reflects light of corresponding wavelengths, acting as a color filter are being researched in order to substitute for the absorptive color filter.

The cholesteric liquid crystal has a spiral structure, and the reflection wavelength is determined by controlling the spiral pitch. Therefore, the wavelength of light that is to be reflected can be controlled by the distribution of the pitches in a pixel.

The wavelength region of the visible light that can be visible to human beings ranges from 400 nm to 700 nm, and central wavelengths of R, G, and B light are respectively around 650 nm, 550 nm, and 450 nm.

That is, if the cholesteric liquid crystal is controlled to vary between left and right pitches with respect to the central wavelength of each of the R, G, B pixels, left-circularly-polarized light or right-circularly-polarized light may be selectively reflected in the wavelength region corresponding to the difference between the pitches, and thus, a cholesteric liquid crystal color filter can be fabricated.

The cholesteric liquid crystal color filter has high optical utilizing efficiency, and selectively reflects light in the corresponding wavelength. Therefore, a cholesteric liquid crystal color filter can improve the color purity and contrast ratio of a display.

However, in a cholesteric liquid crystal color filter, if the light is obliquely incident, rather than vertically incident, the reflective wavelength band shifts, and thus, undesired wavelength components may be transmitted through the cholesteric liquid crystal color filter. That is, the cholesteric liquid crystal selectively reflects light of a certain wavelength according to the rotating pitch of the cholesteric liquid crystal. Since the thickness of the cholesteric liquid crystal color filter varies according to the incident angle of the light, the pitch of the cholesteric liquid crystal also varies, and the wavelength of the reflected light varies. This problem is manifested as crosstalk when the cholesteric liquid crystal color filter is applied to a display device, and the light incident on the cholesteric liquid crystal color filter must be collimated vertically in order to reduce the above problem.

FIG. 1 illustrates a cross-sectional view of an illuminating apparatus including a related art cholesteric liquid crystal color filter. Referring to FIG. 1, the illuminating apparatus including the conventional cholesteric liquid crystal color filter includes a backlight 12, and a linear polarization plate 11 on a side of the backlight 12 on which a glass substrate 1, an alignment layer 2, a quarter wave plate 3, and a cholesteric liquid crystal layer 4 are sequentially stacked. The linear polarization plate 11 is required in this structure since the backlight 12 does not have a polarization-separation function, and the linear polarization plate 11 is an absorptive type of element that only transmits the linearly polarized light and absorbs the remaining light such that the optical utilizing efficiency decreases. In addition, a unit for collimating the light incident on the cholesteric liquid crystal layer 4 within a small angle is not included.

SUMMARY OF THE INVENTION

The present invention provides an illuminating apparatus providing a polarized color light having high polarization efficiency and high color purity properties, including a cholesteric liquid crystal color filter and a polarization LGP unit that can improve polarization efficiency and increase the amount of vertical exiting light, and a display apparatus including the illuminating apparatus.

According to another aspect of the present invention, there is provided an illuminating apparatus providing polarized color light, the apparatus including: a light source; a polarization LGP unit which converts a polarization direction of light emitted from the light source into linearly polarized light and collimates the light; and a cholesteric liquid crystal color filter, disposed on an upper portion of the polarization LGP unit, which selectively reflects light according to a polarized status and wavelength of light.

BRIEF DESCRIPTION OF THE DRAWINGS

The above and other aspects of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 1:
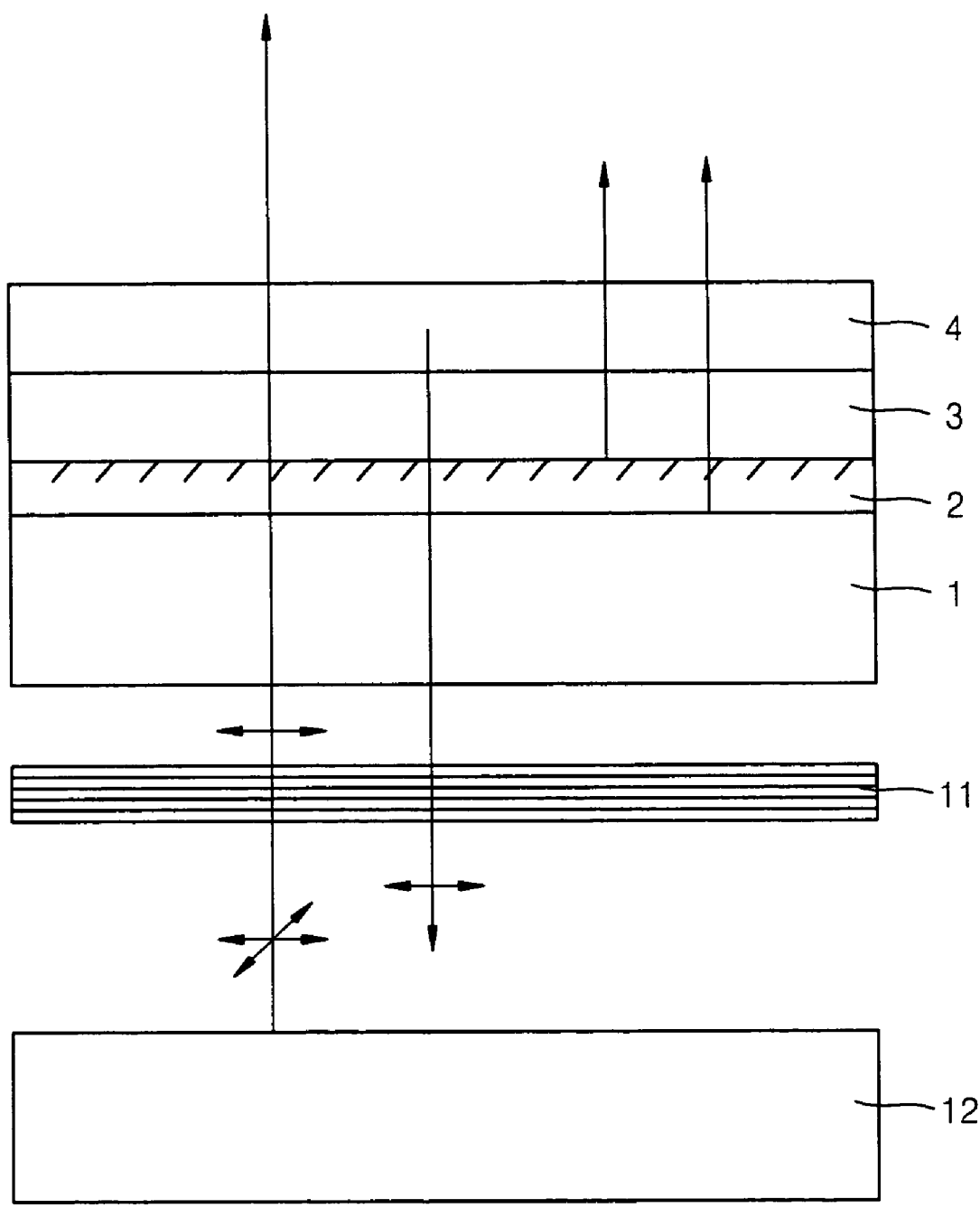
FIG. 1 is a cross-sectional view of an illuminating apparatus using a cholesteric liquid crystal color filter according to the related art.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements, and thus their description will be omitted.

Figure 2:
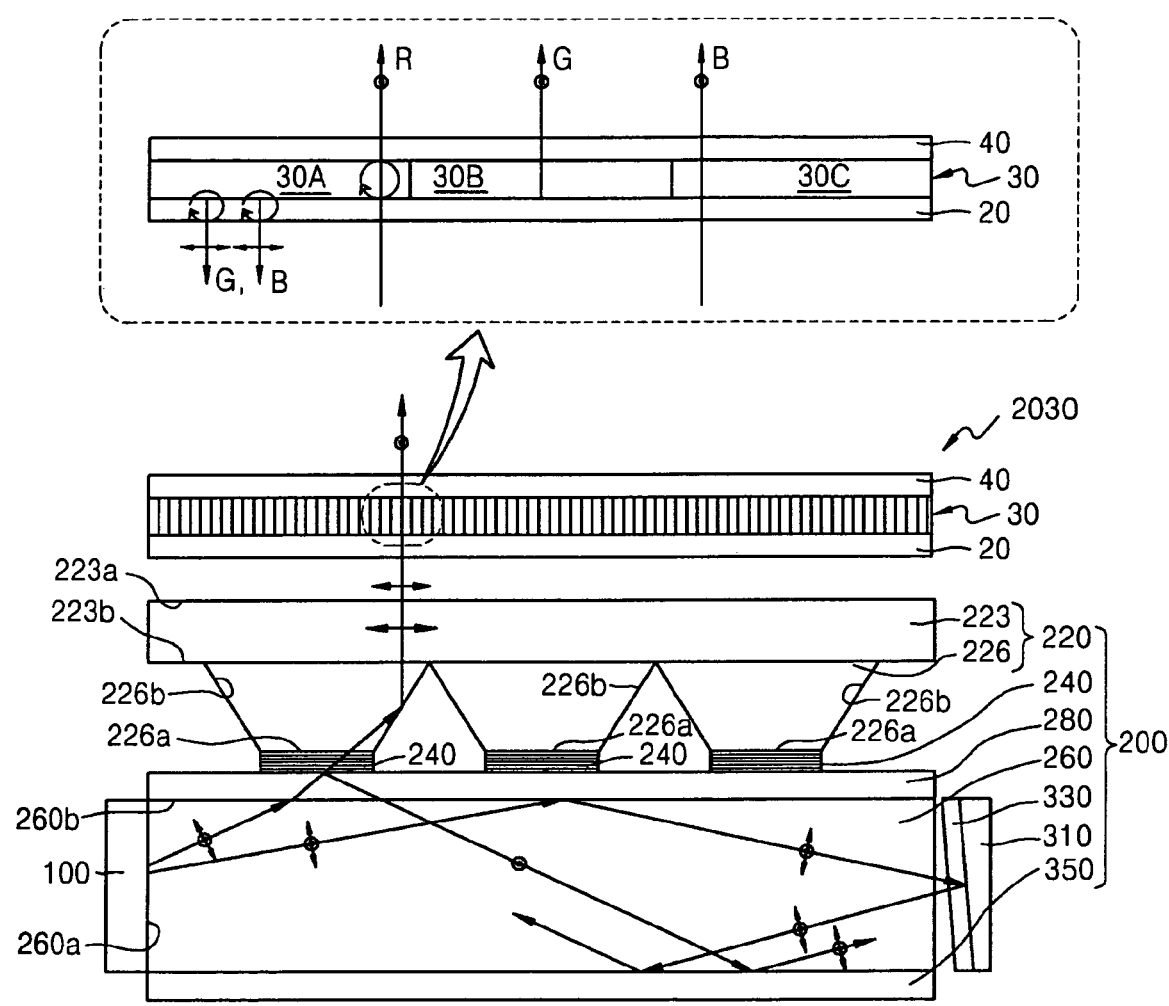
FIG. 2 is a schematic cross-sectional view of an illuminating apparatus according to an exemplary embodiment of the present invention.

FIG. 2 illustrates a cross-sectional view of an illuminating apparatus according to an exemplary embodiment of the present invention. Referring to FIG. 2, an illuminating apparatus 2030 includes a light source 100; a polarization LGP unit 200, converting unpolarized light emitted from the light source 100 into linearly polarized light; and a cholesteric liquid crystal color filter 30.

A light source 100 may be a linear light source such as cold cathode fluorescent lamp (CCFL) or point light source such as a light-emitting diode (LED). The polarization LGP unit 200 includes a LGP 260 guiding the light emitted from the light source 100, a collimating member 220 disposed on an upper portion of the LGP 260, and a polarization separating layer 240 disposed between the LGP 260 and the collimating member 220 to separate the light emitted from the LGP 260 according to its polarization components. The polarization separating layer 240 separates linearly polarized light in a predetermined direction, and the collimating member 220 collimates the light in a perpendicular direction to an exit surface. The polarization separating layer 240 and the collimating member 220 will be described later.

The cholesteric liquid crystal color filter 30 is disposed on an upper portion of the polarization LGP unit 200. The cholesteric liquid crystal color filter 30 is formed of cholesteric liquid crystal or liquid crystal polymers, and is a color filter selectively reflecting or transmitting light according to the polarization status and wavelengths of light using the liquid crystal molecular characteristics. For example, the cholesteric liquid crystal molecules have a spiral structure, and the characteristics of the cholesteric liquid crystal molecules can be represented by the rotating direction and pitch, that is, a period, of the spiral. The cholesteric liquid crystal color filter 30 selectively reflects light that is circularly-polarized in the same direction as the rotating direction of the spiral and is in a wavelength corresponding to the pitch among light incident onto the cholesteric liquid crystal color filter 30, and transmits the remaining light. The cholesteric liquid crystal color filter 30 is divided into pixel areas 30A through 30C transmitting light of R, G, and B colors respectively, and each of the pixel areas 30A through 30C is filled with the cholesteric liquid crystal material and the pitch range of which is determined in order to transmit light corresponding to the R, G, and B wavelengths, respectively. Accordingly, the light of a certain wavelength band is transmitted in each of the pixel areas 30A through 30C, and thus, R, G, and B light can be emitted.

The first and second polarization changing members 20 and 40 can be further disposed on a lower portion and an upper portion of the cholesteric liquid crystal color filter 30. The first polarization changing member 20 is disposed on the upper portion of the polarization LGP unit 200 in order to change linearly polarized light emitted from the polarization LGP unit 200 into circularly polarized light. For example, light of S polarization is changed into left-circularly-polarized light, and light of P polarization is changed into right-circularly-polarized light. The second polarization changing member 40 changes the circularly polarized light transmitted through the cholesteric liquid crystal color filter 30 into linearly polarized light. For example, left-circularly-polarized light is changed into light of P polarization, and right-circularly-polarized light is changed into light of S polarization.

First and second polarization changing members 20 and 40 may be quarter wave plates.

Hereinafter, the structure of the polarization LGP unit 200, the principles of collimating the incident light perpendicularly to the exit surface of the polarization LGP unit 200 and providing the polarized light by the polarization LGP unit 200 will be described in more detail. The LGP 260 includes an incident surface 260a and a light exiting surface 260b, and thus, light emitted from the light source 100 is transmitted through the incident surface 260a and exits through the light exiting surface 260b. The LGP 260 is formed of a transparent material that can transmit the incident light, for example, an optically isotropic material such as Polymethylmethacrylate (PMMA) or Poly Carbonate (PC).

Figure 3A:
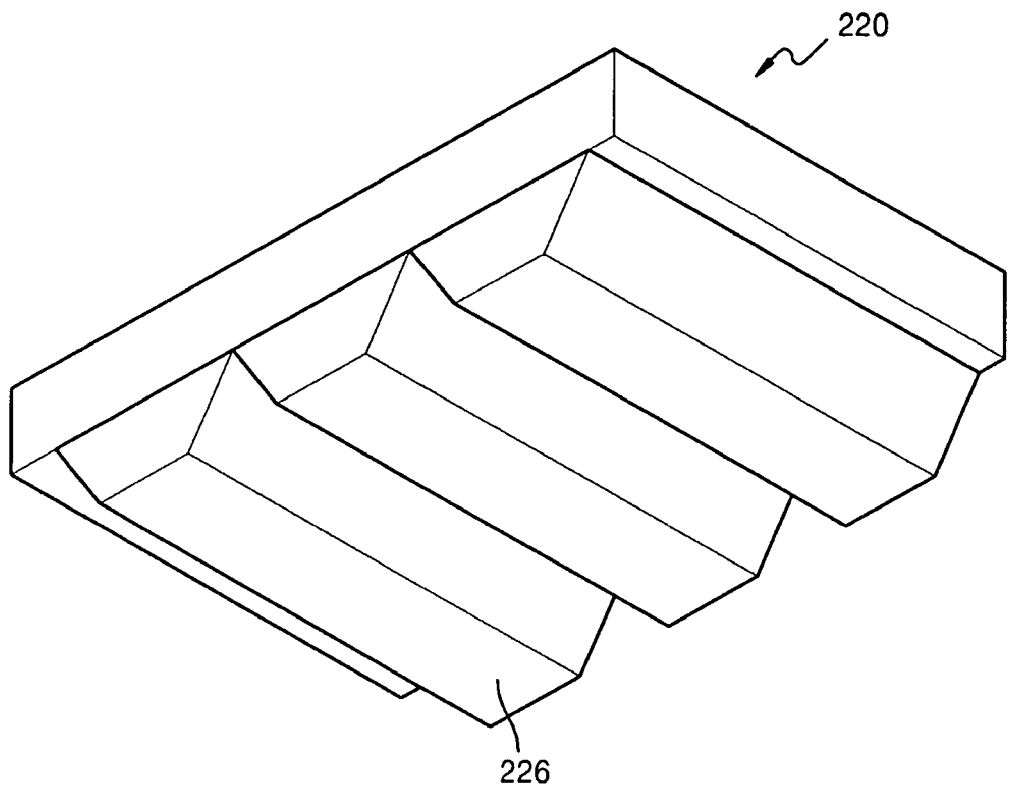
FIGS. 3A and 3B are perspective views of a collimating member of the illuminating apparatus illustrated in FIG. 2, according to an exemplary embodiment of the present invention.
Figure 3B:
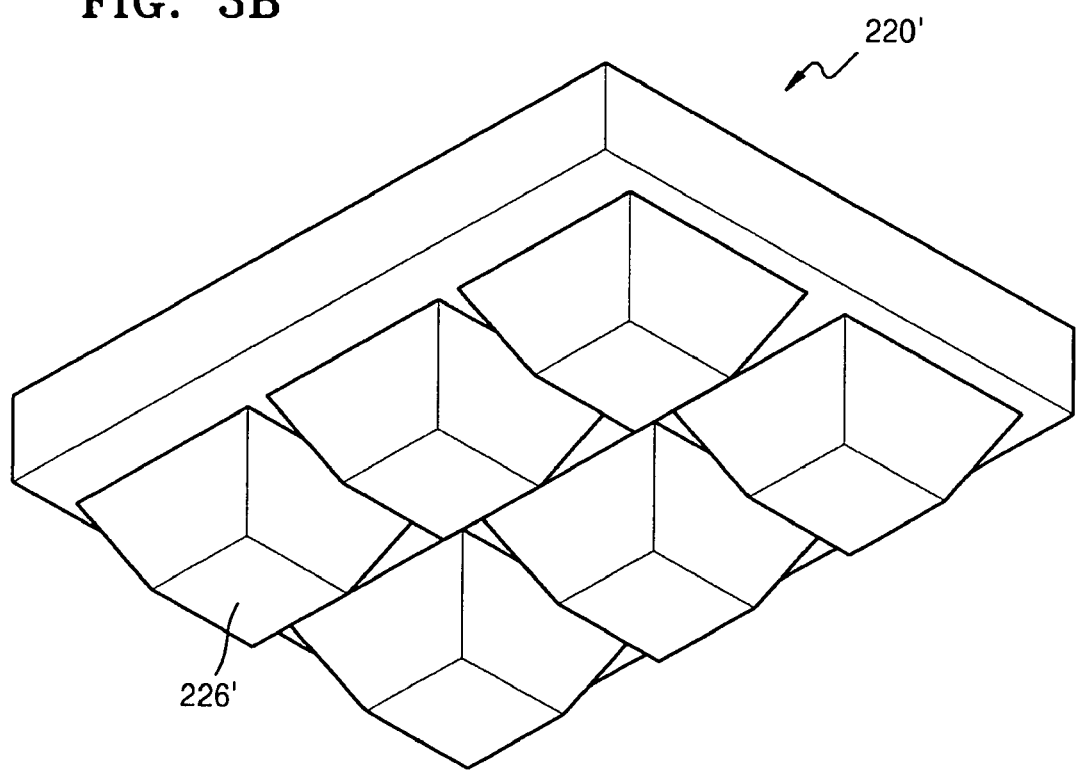

The collimating member 220 includes a plurality of reflective patterns 226 for reflecting light emitted from the LGP 260 upwards, and each of the reflective patterns 226 includes an inclined surface 226b. The collimating member 220, for example, includes a substrate 223 and a plurality of reflective patterns arranged on the substrate 223. The reflective patterns 226 are disposed to face the LGP 260. The substrate 223 includes an exit surface 223a through which light exits, and the reflective patterns 226 include a pattern lower surface 226a to which the light emitted from the light exiting surface 260b is incident, and the inclined surface 226b that totally reflects the incident light toward the exit surface 223a of the substrate 223. The reflective patterns 226, for example, may have a polyhedral shape. The inclined surface 226b collimates light exiting toward the exit surface 223a of the substrate 223 in a direction perpendicular to the exit surface 223a of the substrate 223. That is, the direction in which light is collimated can be adjusted by adjusting the slope of the inclined surface 226b of the reflective patterns 226. The inclined surface 226b of the reflective patterns 226 have a slope such that an angle between light that is totally reflected from the inclined surface 226b of the reflective patterns 226 and exits through the exit surface 223a of the substrate 223 and a normal of the exit surface 223a is between about −10° and 10°. FIGS. 3A and 3B illustrate perspective views of a collimating member of the illuminating apparatus illustrated in FIG. 2, according to an embodiment of the present invention.

Referring to FIGS. 3A and 3B, the collimating member 220 includes the plurality of reflective patterns 226 that may be arranged in one or two-directional arrays.

The polarization separating layer 240, formed of a plurality of thin films having different refractive indices, is formed between the light exit surface 260b and the pattern lower surface 226a and transmits light having a first polarization direction of light entering through the pattern lower surface 226a and reflects light having a second polarization orthogonal to the first polarization. For example, the first polarization and the second polarization may be horizontal and vertical polarizations P and S, respectively. The separation of the polarization of the incident light by the polarization separating layer 240 will be described later.

An adhesion layer 280 may be disposed between the LGP 260 and the polarization separating layer 240. The adhesion layer 280 may have a lower refractive index than that of the LGP 260. In this case of the light exiting the light exiting surface 260b, only light having an incident angle less than a critical angle can be transmitted through the adhesion layer 280, so light is incident on the inclined surface 226b of the reflective patterns 226 over a narrow range of angles, thus causing light reflected from the inclined surface 226a to exit through the exit surface 223a of the substrate 223 over a narrow range of angles.

Figure 4:
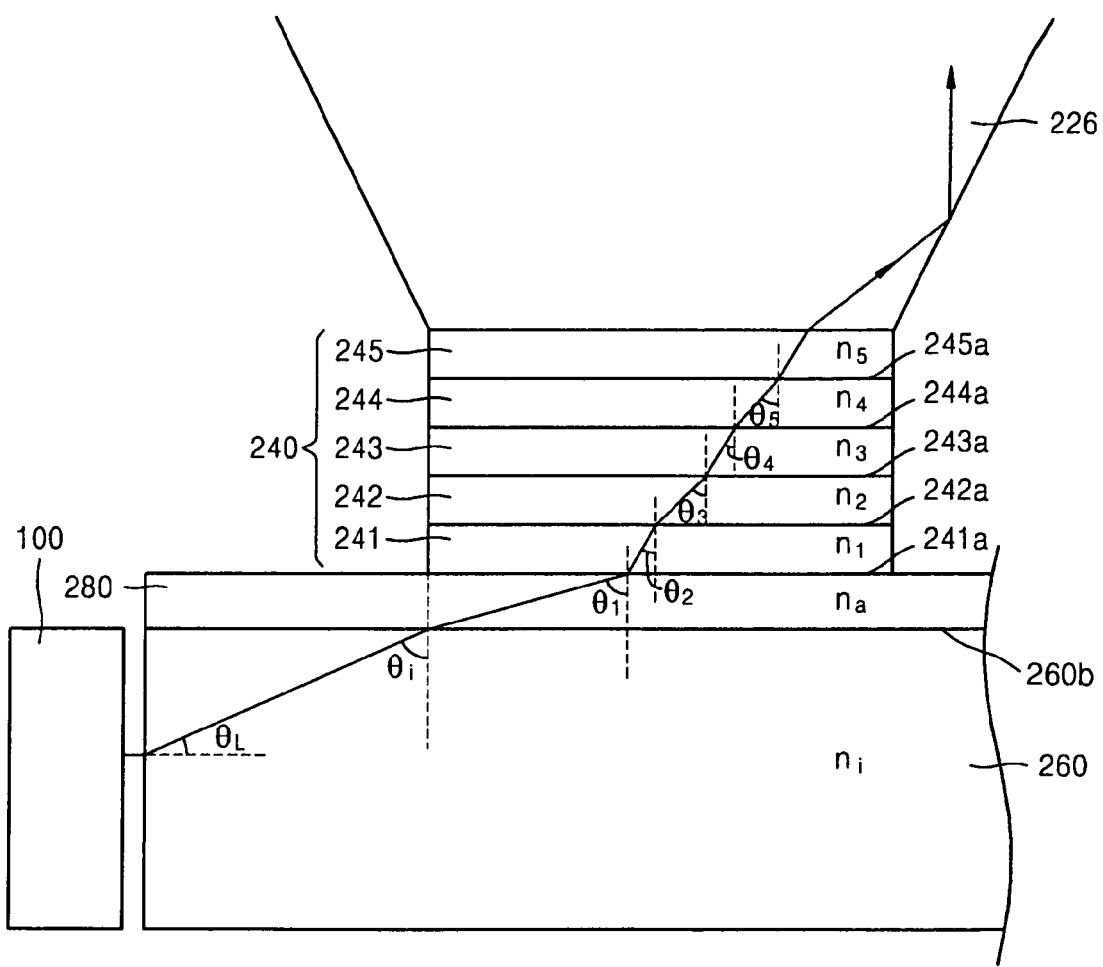
FIG. 4 is a view of a structure of a polarization separation layer of the illuminating apparatus illustrated FIG. 2 and a method of separating polarized light.

A reflective plate 310 may be further disposed opposite a surface of the LGP 260 facing the incident surface 260a and reflects light totally reflected from the interface between the LGP 260 and the adhesion layer 280 and light of the polarization reflected by the polarization separating layer 240 back into the LGP 260. The light reflected by the reflective plate 310 propagates inside the LGP 260 along a partially changed path before being transmitted through the adhesion layer 280. A third polarization changing member 330 may be further disposed between the reflective plate 310 and the LGP 260. In this case, light of S polarization that is not transmitted through the polarization separating layer 240 is converted into light of P polarization in order to be transmitted through the polarization separating layer 240. In order to change the polarization direction easily, a fourth polarization changing member 350 may be disposed on a surface facing the light exiting surface 260b. The third and fourth polarization changing members 330 and 350 may be quarter wave plates formed of an anisotropic material. In addition, either the third polarization changing member 330 or the fourth polarization changing member 350 may be disposed separately. FIG. 4 is a diagram illustrating the structure of the polarization separating layer 240 of the polarization LGP unit 200 and the process of separating light according to the polarization components. Referring to FIG. 4, the polarizing separating layer 240 is formed from a stack of first through fifth layers 241 through 245 having refractive indices $n_1$ through $n_5$ on a structure in which the LGP 260 having a refractive index $n_i$ and the adhesion layer 280 having a refractive index $n_a$ have been sequentially stacked. The propagation path of light will now be described in greater detail. First, the range of an incident angle $\theta_i$ of light propagating to the adhesion layer 280 through the LGP 260 is defined by Equation 1.

$$90°-\theta_{c1}=90°-\sin^{-1}(1/n_i)<\theta_i<\theta_{c2}=\sin^{-1}(n_a/n_i) \quad (1)$$

$\theta_{c1}$ denotes a critical angle at which total reflection occurs as light propagates from the LGP 260 having the refractive index $n_i$ to an air layer having a refractive index of 1. Because $\theta_{c1}$ is a maximum value of an angle $\theta_L$ of light incident on the LGP 260, as light from the light source 100 propagates toward the LGP 260 through the air layer, 90°-$\theta_{c1}$ is a minimum value of light traveling toward the adhesion layer 280 at the light exiting surface 260b. In addition, $\Theta_{c2}$ denotes a critical angle at which total reflection occurs as light propagates from the LGP 260 toward the adhesion layer 280 and is a maximum value of the incident angle $\theta_i$ of light that can propagate toward the adhesion layer 280. Incident angles $\theta_1$ through $\theta_5$ at first through fifth interfaces 241a through 245a are determined based on the range of the incident angle $\theta_i$ defined by Equation 1 and Snell's law. When Brewster's angles $\theta_{B1}$ through $\theta_{B5}$ are within the ranges of the incident angles $\theta_1$ through $\theta_5$ at the first through fifth interfaces 241a through 245a, respectively, light of S polarization is reflected and light of P polarization is transmitted. Brewster's angle is defined as $\tan^{-1}(n_2/n_1)$ when light propagates from a medium having a refractive index $n_1$ to a medium having a refractive index $n_2$. The ranges of the incident angles $\theta_1$ through $\theta_5$ should respectively contain Brewster's angles $\theta_{B1}$ through $\theta_{B5}$ so that the polarization separation can occur at the first through fifth interfaces 241a through 245a.

For example, it is assumed that the refractive index $n_1$ is higher than the refractive index $n_2$ and the range of the incident angle $\theta_2$ of light propagating from the medium having a high refractive index $n_1$ to the medium having a low refractive index $n_2$ includes Brewster's angle $\theta_{B2}$ at the second interface 242a. The angle $\theta_3$ at which light is transmitted through the second interface 242a is an angle at which light is incident to the third layer 243 having a refractive index $n_3$. The angle $\theta_3$ is greater than the incident angle $\theta_2$. In order for the range of the incident angle $\theta_3$ to contain Brewster's angle $\theta_{B3}$ at the third interface 243a, Brewster's angle $\theta_{B3}$ may be greater than Brewster's angle $\theta_{B2}$. Therefore, $n_3$ may be greater than $n_2$. Using this principle, the polarization separating layer 240 may include a plurality of alternating high and low refractive index layers.

The polarization separating layer 240 includes thin layers of a material that is transparent at visible light wavelengths such as, but not limited to, $Al_2O_3$, $CeO_2$, $Ta_2O_5$, $TiO_2$, ZnS, $ZrO_2$, $CaF_2$, or $MgF_2$.

When the LGP 260 and the adhesion layer 280 have refractive indices of 1.59 and 1.45, respectively, and when the polarization separating layer 240 has alternating layers of two materials with refractive indices of 2.35 and 1.63, $51.03° < \theta_i < 65.78°$ as defined by Equation 1.

Table 1 illustrates the ranges of the incident angles $\theta_1$ through $\theta_5$ and Brewster's angles $\theta_{B1}$ through $\theta_{B5}$ calculated at the first through fifth interfaces 241a through 245a.

TABLE 1

|  | Range of incident angle | Brewster's angle |
| --- | --- | --- |
| First interface | $58.5 < \theta_1 < 90.0$ | $\theta_{B1} = 58.3°$ |
| Second interface | $31.7 < \theta_2 < 38.1$ | $\theta_{B2} = 34.8°$ |
| Third interface | $49.3 < \theta_3 < 62.8$ | $\theta_{B3} = 55.3°$ |
| Fourth interface | $31.7 < \theta_4 < 38.1$ | $\theta_{B4} = 34.8°$ |
| Fifth interface | $49.3 < \theta_5 < 62.8$ | $\theta_{B5} = 55.3°$ |

Referring to Table 1, the ranges of the incident angles $\theta_2$ through $\theta_5$ at the second through fifth interfaces 242a through 245a respectively contain Brewster's angles $\theta_{B2}$ through $\theta_{B5}$. Even if the range of the incident angle $\theta_1$ does not contain Brewster's angle $\theta_{B1}$, the former may contain the latter by making the refractive index of the adhesion layer 280 slightly greater than 1.45. When the ranges of the incident angles $\theta_1$ through $\theta_5$ at the first through fifth interfaces 241a through 245a are equal to Brewster's angles $\theta_{B1}$ through $\theta_{B5}$, the transmittance of vertical polarization or light of S polarization has a minimum value of 0. In this case, a predetermined portion of incident light having S polarization is reflected and only light of horizontal polarization or light of P polarization is transmitted. Since the transmittance of light of S polarization progressively increases as the incident angles $\theta_1$ through $\theta_5$ deviate further from Brewster's angles $\theta_{B1}$ through $\theta_{B5}$, respectively, only a lower amount of light of S polarization travels toward each successive layer. When the above process is repeated at the first through fifth interfaces 241a through 245a, light of S polarization is repeatedly reflected from the first through fifth interfaces 241a through 245a while light of P polarization is separated and then transmitted through the polarization separating layer 240. Most of the light reflected from the first through fifth interfaces 241a through 245a has S polarization and the remaining light may have P polarization due to the fact that the amount of light of P polarization transmitted decreases slightly as the incident angles $\theta_1$ through $\theta_5$ deviate further from Brewster's angles $\theta_{B1}$ through $\theta_{B5}$, respectively. The light of P polarization that is reflected is converted into light having an incident angle while proceeding through the LGP 260 such that the light of P polarization can be transmitted through the polarization separating layer 240. The light of S polarization may be converted into light of P polarization as the light of S polarization propagates inside the LGP 260. Because even the LGP 260 formed of isotropic material, may have a refractive index that varies slightly according to the polarization direction. Alternatively, light of S polarization may be converted into light of P polarization by the third and fourth polarization changing members 330 and 350, and transmitted through the polarization separating layer 240.

Figure 5:
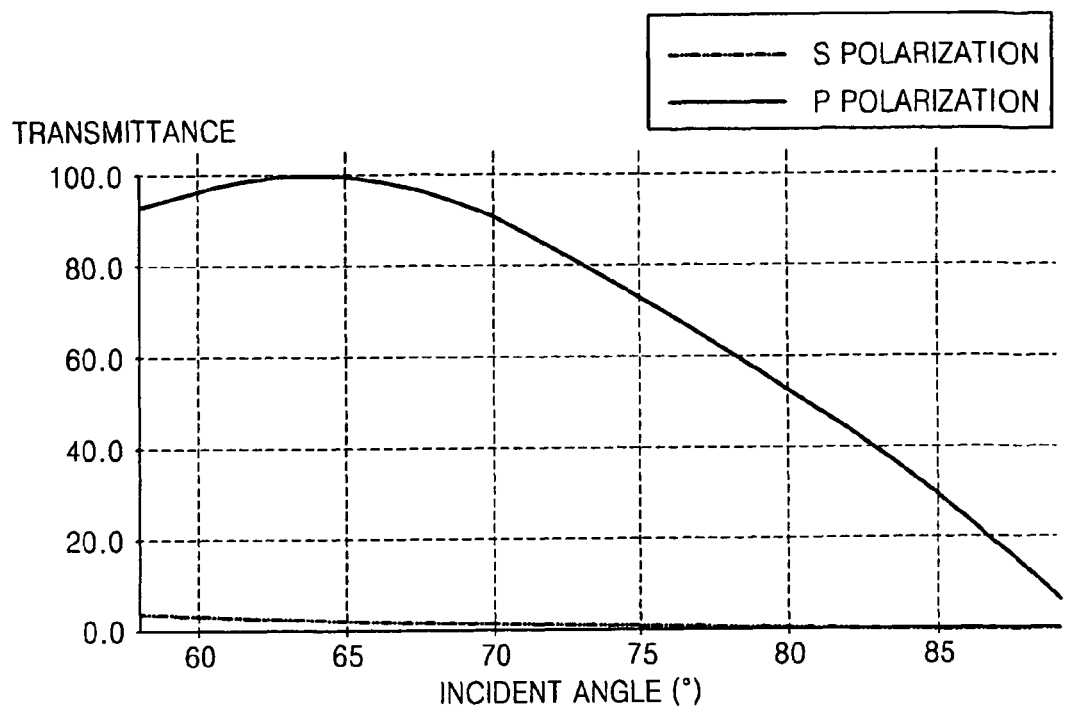
FIG. 5 is a graph illustrating transmittance of light of S polarization and P polarization exiting the polarizing LGP unit of the illuminating apparatus illustrated in FIG. 2 with respect to an incident angle, according to an exemplary embodiment of the present invention.

FIG. 5 is a graph illustrating the transmittance of light of S polarization and P polarization exiting the polarization LGP unit 200 of the illuminating apparatus illustrated in FIG. 2 with respect to an incident angle, according to an exemplary embodiment of the present invention. The light has a wavelength of 550 nm. As evident from the graph illustrated in FIG. 5, light of P polarization has a maximum transmittance of 100% at an incident angle of 64° and the transmittance decreases slightly as the incident angle deviates further from 64°. On the other hand, light of S polarization has a transmittance that is less than 5% over the entire range of incident angles. Thus, the polarization separating layer 240 exhibits excellent efficiency.

Figure 6:
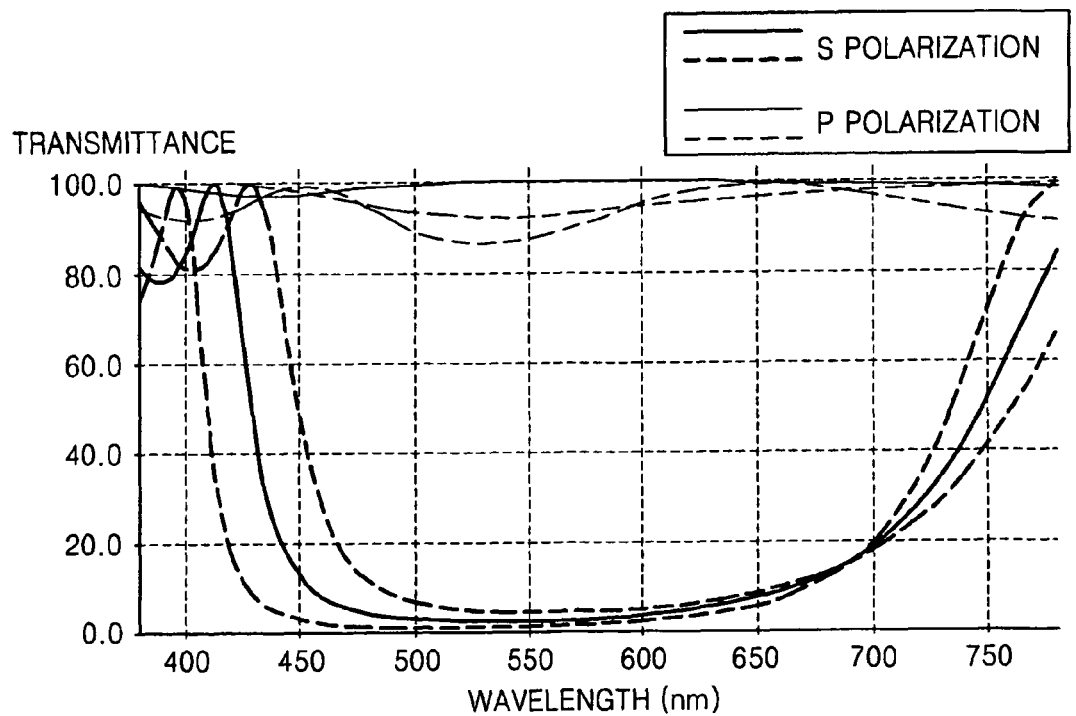
FIG. 6 is a graph illustrating the transmittance of light of S polarization and P polarization exiting the polarizing LGP unit of the illuminating apparatus illustrated in FIG. 2 with respect to wavelength.

FIG. 6 is a graph illustrating the transmittance of light of S polarization and P polarization exiting the polarization LGP unit 200 of the illuminating apparatus illustrated in FIG. 2 with respect to wavelength, according to an exemplary embodiment of the present invention.

Solid lines represent transmittances at an incident angle of 64°, and dotted lines represent transmittances at incident angles of 54° and 74°. As evident from the graph illustrated in FIG. 6, light of P polarization has a transmittance greater than about 90% over the entire range of wavelengths while light of S polarization has a transmittance less than about 20% in most of the visible light region of 450 nm to 700 nm.

As the number of layers in the polarization separating layer 240 increases, the efficiency of polarization separation can increase because the separation of polarization occurs more from the use of a greater number of interfaces. Furthermore, the efficiency of polarization separation can increase by choosing the refractive index of each layer such that Brewster's angle is optimally selected with respect to the range of an incident angle.

Figure 7:
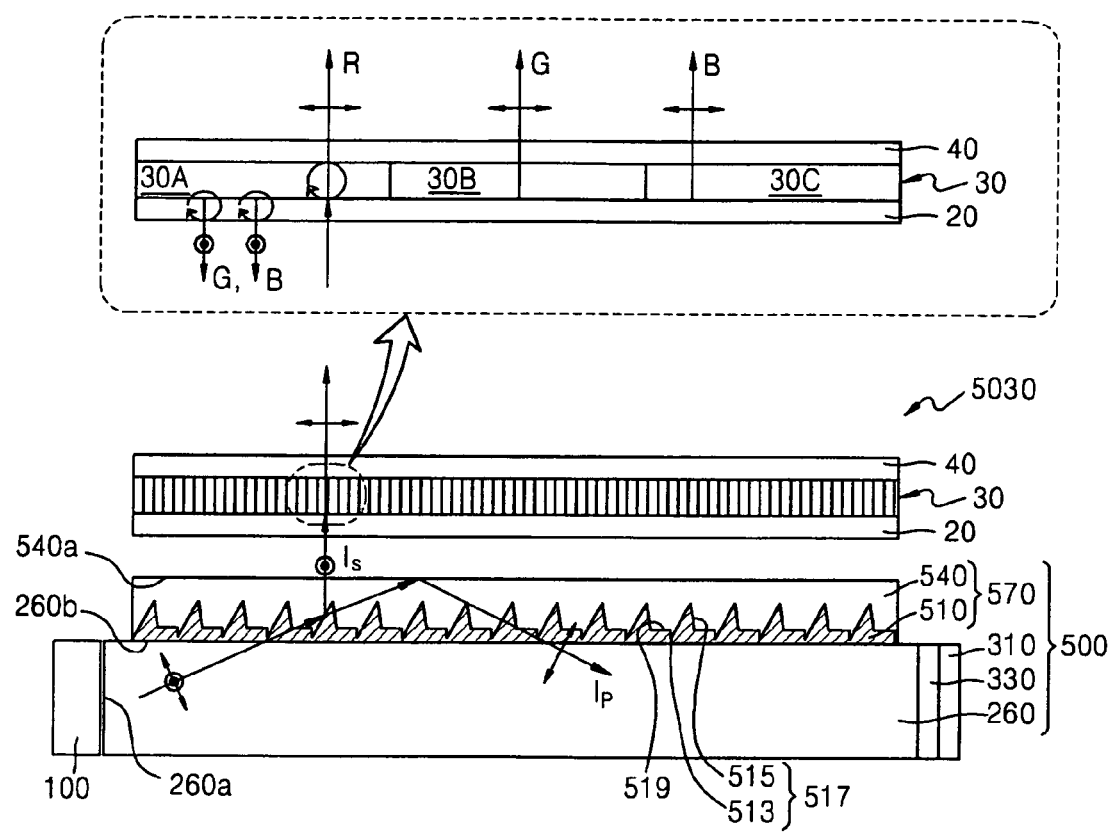
FIG. 7 is a cross-sectional view of an illuminating apparatus according to another exemplary embodiment of the present invention.

FIG. 7 illustrates a schematic cross-sectional view of an illuminating apparatus 5030 according to another exemplary embodiment of the present invention. Referring to FIG. 7, the illuminating apparatus includes a light source 100, a polarization LGP unit 500 converting unpolarized light emitted from the light source 100 into linearly polarized light, and a cholesteric liquid crystal color filter 30. A first polarization changing member 20 and a second polarization changing member 40 may be further disposed on a lower portion and an upper portion of the cholesteric liquid crystal color filter 30, respectively.

Structures and operations of the first and second polarization changing members 20 and 40, and the cholesteric liquid crystal color filter 30 are the same as those of the illuminating apparatus 2030 illustrated in FIG. 2, and thus, a detailed description will be omitted.

The polarization LGP unit 500 includes a LGP 260 guiding light emitted from the light source 100, and a fine structure layer 570 formed on an upper surface of the LGP 260 in order to separate the polarization of light emitted from the LGP 260 and to collimate the light. The LGP 260 includes an incident surface 260a onto which light is incident, and a light exiting surface 260b through which light exits. The fine structure layer 570 includes a first layer 510 on which exit units 517, including concave portions 513 and convex portions 515, are repeatedly arranged; and a second layer 540 formed on the first layer 510 of an anisotropic material having different diffractive indices according to the polarization of the incident light. The anisotropic material may be, but is not limited to, Poly Ethylene Terephthalate (PET), Poly Butylene Terephthalate (PBT), or Poly Ethylene Naphthalate (PEN). The concave portions 513 and the convex portions 515 are formed continuously, and a plane portion 519 is formed between adjacent exit units 517. The concave portions 513 may include a curved surface and a planar surface, or two or more planar surfaces. A reflective plate 310 may be further disposed on a side portion of the LGP 260, and a third polarization changing member 330 may be further disposed between the LGP 260 and the reflective plate 310.

Operations of the polarization LGP unit 500 having the above structure will be described as follows. The light emitted from the light source 100 is incident on the incident surface 260a of the LGP 260 and emitted in every direction. The light proceeding downwards is reflected by the lower surface of the LGP 260 towards the light exiting surface 260b, and light proceeding towards the light exiting surface 260b is refracted and transmitted through the first layer 510 and is incident on the second layer 540. Since the LGP 260 and the first layer 510 of the fine structure layer 570 are formed of the optical isotropic material, the path of light passing through LGP 260 and the first layer 510 does not vary according to the polarization direction of light. On the contrary, the second layer 540 is formed of the optical anisotropic material such that light incident on the second layer 540 is refracted differently according to the polarization direction of light, and thus, the path of the light changes. The LGP 260 and the first layer 510 of the fine structure layer 570 are formed of materials having the same or similar refractive indices. For example, the LGP 260 may be formed of PMMA having a refractive index of 1.49, and the first layer 510 of the fine structure layer 570 may be formed of a resin having a refractive index of 1.5. Otherwise, the LGP 260 and the first layer 510 may be formed integrally with each other using the same material. The second layer 540 is formed of a material having the same or a similar refractive index to that of the first layer 510 with respect to light of first polarization, and a refractive index greater than that of the first layer 510 with respect to light of second polarization. The light of first polarization may be light of P polarization, and the second polarization may be light of S polarization. In this case, light of first polarization is transmitted through the first layer 510, and is incident on the upper surface of the second layer 540 at an angle greater than a critical angle and is totally reflected downwards. In addition, light of second polarization is incident on the convex portion 515 of the first layer 510 at an angle greater than the critical angle, and thus, is totally reflected towards the second layer 540 and emitted nearly perpendicular to an exit surface 540a 570. The polarization direction of light of first polarization that is not emitted is converted during its propagation through the LGP 260 or by the third polarization changing member 330, and thus, the light of first polarization can be emitted upwards.

Figure 8:
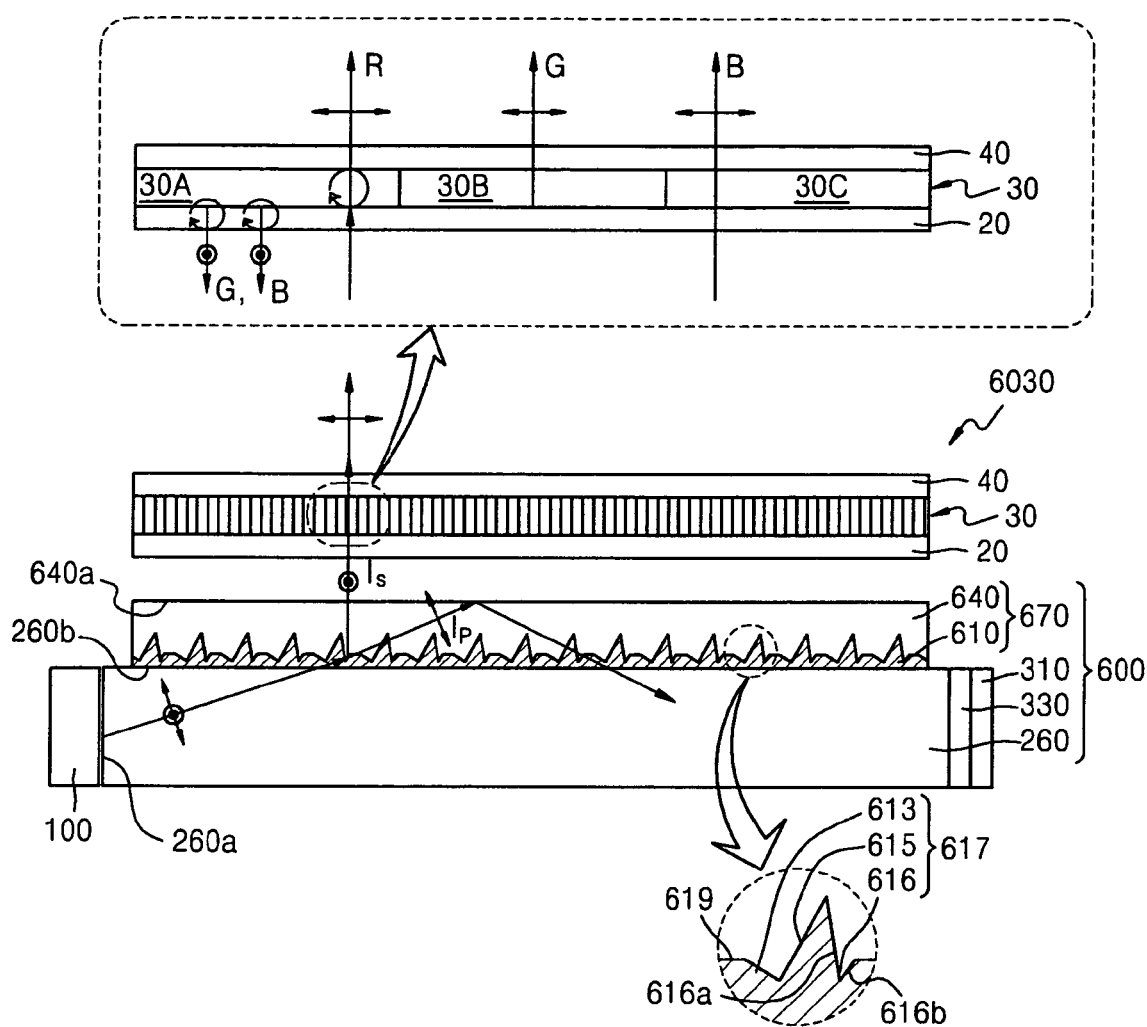
FIG. 8 is a cross-sectional view of an illuminating apparatus according to another exemplary embodiment of the present invention.

FIG. 8 illustrates a cross-sectional view of an illuminating apparatus 6030 according to another embodiment of the present invention. Referring to FIG. 8, the illuminating apparatus 6030 includes a light source 100, a polarization LGP unit 600 converting unpolarized light emitted from the light source 100 into linearly polarized light, and a cholesteric liquid crystal color filter 30. A first polarization changing member 20 and a second polarization changing member 40 may be further disposed on a lower portion and an upper portion of the cholesteric liquid crystal color filter 30, respectively. The illuminating apparatus 6030 of the current embodiment has the same structure as that of the embodiment illustrated in FIG. 7 except for a fine structure layer 670, and thus, the fine structure layer 670 will be described as follows.

The fine structure layer 670 is formed on a LGP 260, and includes a first layer 610 on which exit units 617 including a first concave portion 613, a convex portion 615, and a second concave portion 616 are repeatedly arranged, and a second layer 640, formed on the first layer 610, of an anisotropic material having a refractive index that differs according to the polarization of the incident light. The LGP 260 and the first layer 610 are formed of optical isotropic materials having the same or similar refractive indices. The second layer 640 is formed of an optical anisotropic material, for example, a material having the same or a similar refractive index to that of the first layer 610 with respect to light of first polarization and a refractive index greater than that of the first layer 610 with respect to light of second polarization. The principles of separating out light of a second polarization while light passes through the LGP 260, the first layer 610 and the second layer 640, and exits vertically are the same as those of the above embodiment illustrated in FIG. 7. The second concave portion 616 reduces light from exiting with a larger exit angle in order to increase light exiting vertically. The exit angle is an angle between a line normal to the upper surface of the second layer 640 of the fine structure layer 670 and the exit light. The second concave portion 616 makes light exiting the fine structure layer exit with a relatively large angle, near vertical. That is, light of second polarization, of the light transmitting through a first surface 616a of the second concave portion 616, is totally reflected upwards by a second surface 616b of the second concave portion 616. When light is reflected by the second surface 616b of the second concave portion 616, light is reflected with an exit angle that is nearly perpendicular to an exit surface 640a. The first and second concave portions 613 and 616 can include two or more planes, or a curved surface and a plane, respectively. In addition, the central angles of the first concave portion 613, the convex portion 615, and the second concave portion 616 can be adjusted in order to increase the amount of light exiting in the vertical direction.

Figure 9:
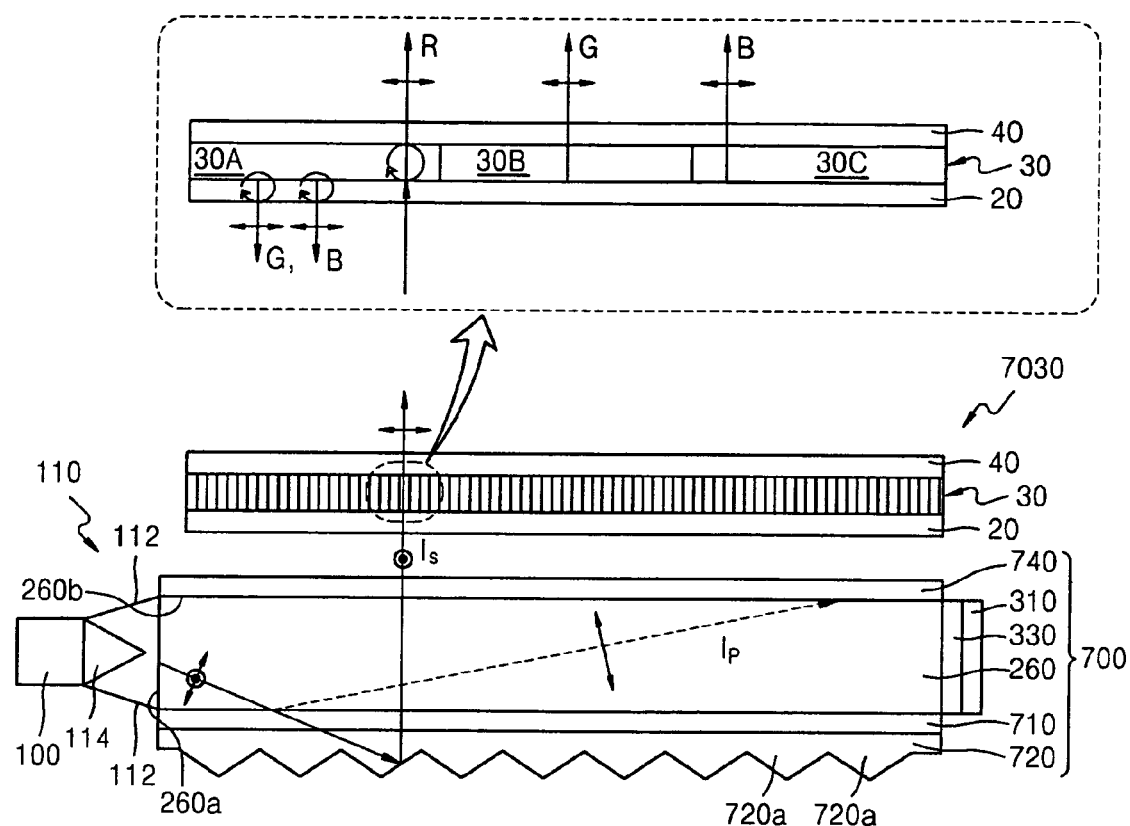
FIG. 9 is a cross-sectional view of an illuminating apparatus according to another exemplary embodiment of the present invention.
Figure 10:
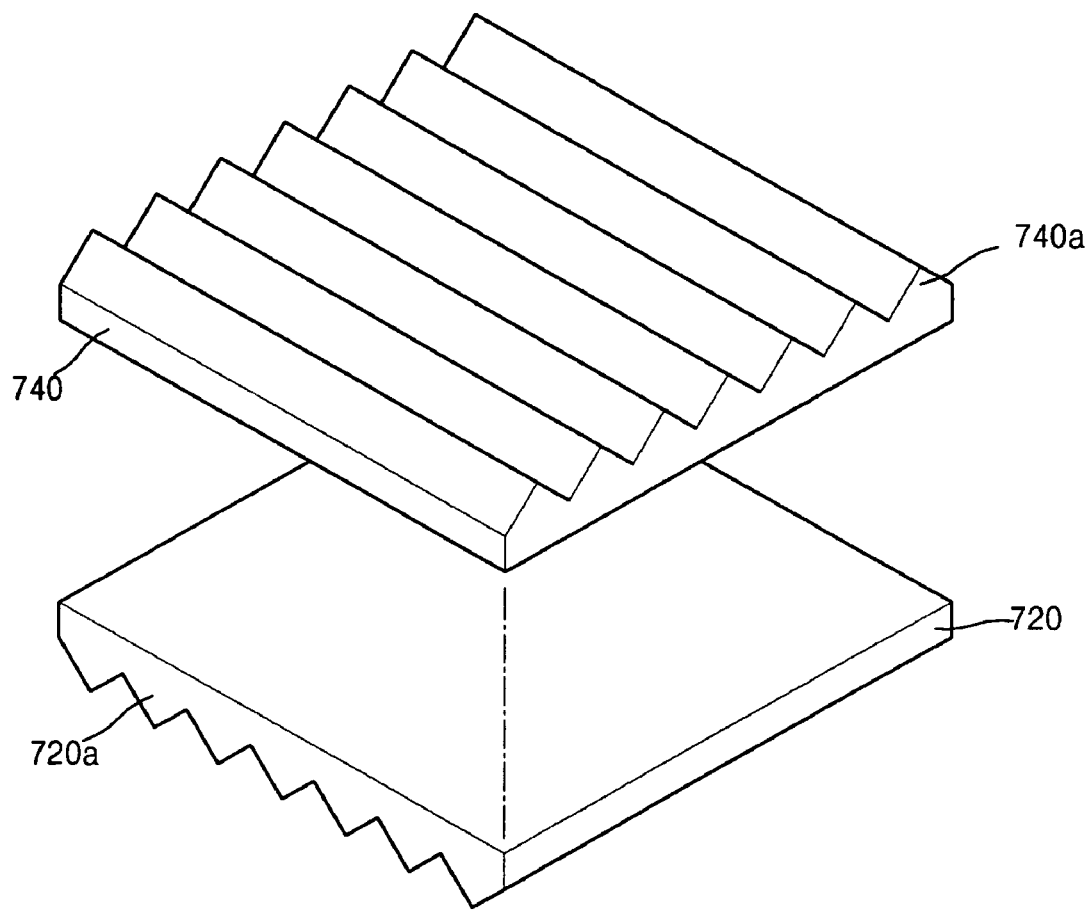
FIG. 10 is a perspective view of arrangements of first and second light exiting layers in the illuminating apparatus illustrated in FIG. 9.

FIG. 9 illustrates a cross-sectional view of an illuminating apparatus 7030 according to another embodiment of the present invention, and FIG. 10 illustrates a perspective view of an arrangement of first and second light exiting layers 720 and 740 of the illuminating apparatus illustrated in FIG. 9, according to an embodiment of the present invention. Referring to FIGS. 9 and 10, the illuminating apparatus 7030 includes a light source 100; a collimator 110, collimating light emitted from the light source 100; a polarization LGP unit 700, converting unpolarized light emitted from the light source 100 into linearly polarized light; and a cholesteric liquid crystal color filter 30. A first polarization changing member 20 and a second polarization changing member 40 may be further disposed on a lower portion and an upper portion of the cholesteric liquid crystal color filter 30, respectively.

Structures and operations of the first and second polarization changing members 20 and 40, and the cholesteric liquid crystal color filter 30 are the same as those of the embodiment illustrated in FIG. 2, and thus, a detailed description thereof will be omitted.

The polarization LGP unit 700 includes the collimator 110, reducing the range of the incident angles of light emitted from the light source 100; a LGP 260, guiding light incident through the collimator 110; an anisotropic layer 710 disposed on a lower portion of the LGP 260 and formed of an anisotropic material having a refractive index which varies according to the polarization direction of the light; and a first light exiting layer 720 disposed on a lower portion of the anisotropic layer 710 to emit light transmitted through the anisotropic layer 710 upwards.

The collimator 110 is disposed on a side portion of the LGP 260 that is adjacent to the light source 100. The collimator 110 includes a plurality of reflective mirrors 112 that are facing each other and a triangle prism 114 disposed between the reflective mirrors 112. The reflective mirrors 112 are formed as trapezoids such that each of the reflective mirrors 112 has a narrower width on a side adjacent to the light source 100 and a wider width on a side adjacent to the LGP 260. The triangular prism 114 has a bottom surface facing the light source 100 and a corner opposite to the bottom surface facing the LGP 260.

The LGP 260 includes an incident surface 260a onto which light is incident, and a light exiting surface 260b emitting the light, and is formed of an optical isotropic material.

The anisotropic layer 710 is formed of an optical anisotropic material having a refractive index less than that of the LGP 260 with respect to the light of first polarization, and a refractive index that is the same or similar to that of the LGP 260 with respect to light of second polarization.

The first light exiting layer 720 is formed of an isotropic material, and includes first light exiting patterns 720a for collimating light transmitted through the anisotropic layer 710 in a direction perpendicular to the light exiting surface 260b of the LGP 260 by total reflection. The first light exiting patterns 720a may be prism patterns, and may be arranged in a one-dimensional array along a first direction.

A reflective plate 310 can be further disposed on a side portion of the LGP 260, and a third polarization changing member 330 such as a quarter wave plate can be further disposed between the LGP 260 and the reflective plate 310. A second light exiting layer 740 can be further disposed on the upper portion of the LGP 260, and the second light exiting layer 740 may include second light exiting patterns 740a additionally collimating light exiting through the light exiting surface 260b of the LGP 260. Referring to FIG. 9, the second light exiting layer 740 may be disposed so that the second light exiting patterns 740a are arranged in a second direction that is perpendicular to the first direction.

Operations of the polarization LGP unit 700 having the above structure will be described as follows. The collimator 110 collimates light emitted from the light source 100 so that the incident angle of light onto the upper surface or the lower surface of the LGP 260 is greater than the critical angle. Here, the incident angle is an angle between a line normal to the upper or lower surface of the LGP 260 and the incident light. The anisotropic layer 710 disposed on the lower portion of the LGP 260 separates the polarization by totally reflecting light of a certain polarization (it will be described later), and thus, light incident on the LGP 260 needs to be primarily collimated. The shape of the collimator 110 is not limited to the examples shown in the drawings. For example, the length of the collimator 110, the refractive index of the triangle prism 114, and/or the vertical angle size can be variously formed taking the collimating efficiency into consideration. The light incident on the LGP 260 through the collimator 110 proceeds in every direction, and light proceeding upwards is totally reflected downwards by the light exiting surface 260b, and light proceeding downwards is incident on the anisotropic layer 710. The anisotropic layer 710 is formed of a material having a refractive index that is less than that of the LGP 260 with respect to light of first polarization and is the same or similar to that of the LGP 260 with respect to light of second polarization. Therefore, light of first polarization is totally reflected at an interface of the anisotropic layer 710 in order to proceed upwards, and light of second polarization is transmitted through the anisotropic layer 710 and is incident on the first light exiting layer 720. The first light exiting layer 720 is formed of an isotropic material having a refractive index that is the same or similar to that of the anisotropic layer 710 with respect to light of second polarization. Therefore, light incident on the first light exiting layer 720 is transmitted through the interface between the anisotropic layer 710 and the first light exiting layer 720, reaches the light exiting patterns 720a, and is totally reflected upwards. The total reflection direction of the light is nearly perpendicular to the light exiting surface 260b of the light guiding plate 260. The light that is totally reflected by the anisotropic layer 710 has its polarization converted by propagation through the LGP 260 or by the third polarization changing member 330, and then, can be incident on the anisotropic layer 710 and exit in the direction that is nearly perpendicular to the light exiting surface 260b of the light guiding plate 260. If the second light exiting layer 740 including the second light exiting patterns 740a arranged in a direction perpendicular to the arrangement direction of the first light exiting patterns 720a is disposed on the upper portion of the LGP 260, the amount of vertical exiting light increases.

Figure 11:
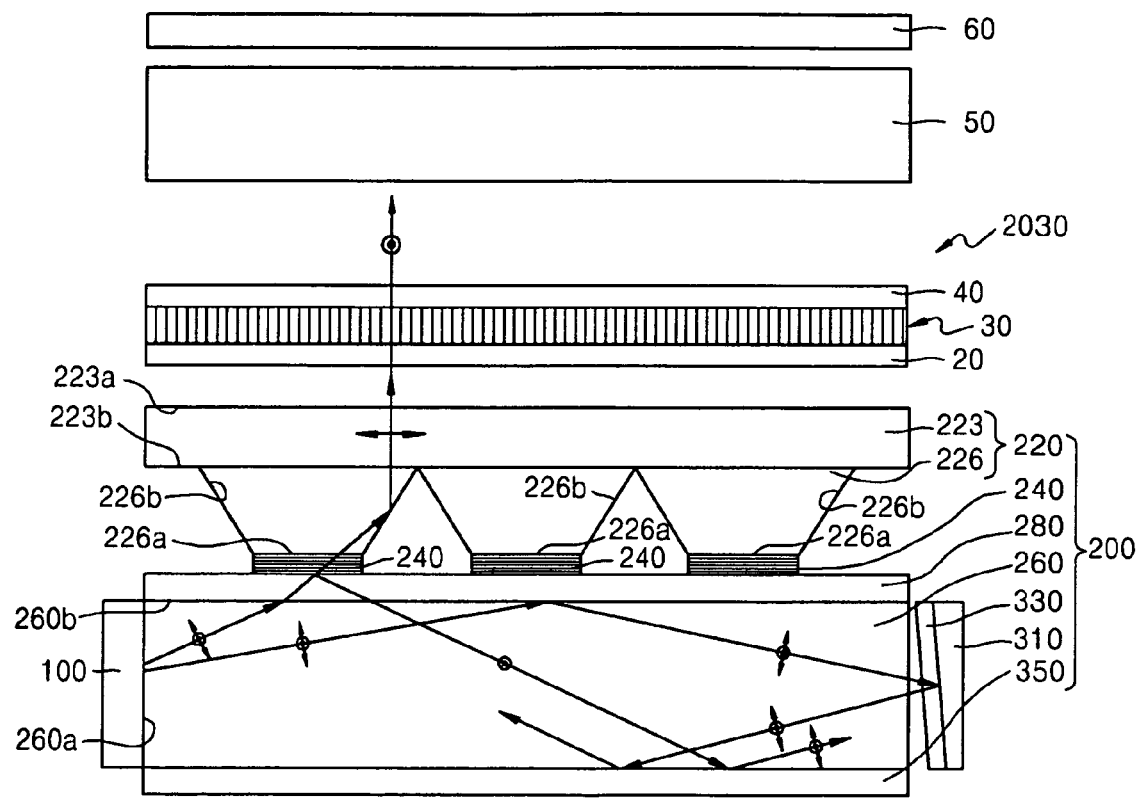
FIG. 11 is a cross-sectional view of a display apparatus according to an exemplary embodiment of the present invention.

FIG. 11 illustrates a cross-sectional view of a display apparatus according to an embodiment of the present invention. Referring to FIG. 11, the display apparatus includes a light source 100; an illuminating apparatus 2030 providing polarized color light; and a display panel 50 displaying images using light emitted from the illuminating apparatus 2030. The illuminating apparatus 2030 has the structure illustrated in FIG. 2, but also, the illuminating apparatuses 5030, 6030, and 7030 illustrated in FIGS. 7 through 9 can be implemented. The illuminating apparatus 2030 provides color light that is linearly polarized, collimated in a direction perpendicular to the exit surface of the illumination apparatus, and has an improved color purity characteristic using the above described principles. The display panel 50 may be a liquid crystal panel. A diffusion plate 60 may be further disposed on the display panel 50. The display panel 50 displays images using light emitted from the illuminating apparatus 2030, and the diffusion plate 60 diffuses light of the image displayed on the display panel 50 in order to increase a viewing angle.

According to an illuminating apparatus of the present invention, the polarized color light having a high polarization efficiency and improved color purity characteristics can be provided using the polarization LGP unit having the structure that increases the optical utilization efficiency and the amount of vertically exiting light, and the cholesteric liquid crystal color filter.

According to an illuminating apparatus of the present invention, unlike the absorptive polarization plate, the polarized light that is not emitted is reflected, and the reflected polarized light is re-used in the polarization LGP and emitted, and thus, the optical utilization efficiency can be increased.

In addition, the cholesteric liquid crystal color filter can selectively reflect light and is implemented instead of using the absorptive color filter, and thus, the reflected light is re-used in the polarization LGP. Overall, the optical utilization efficiency can be increased.

Since light incident on the cholesteric liquid crystal color filter is incident in a direction nearly perpendicular to the incident surface, the color purity characteristics of light can be improved.

Therefore, when an illuminating apparatus is implemented in a display apparatus, the power consumption decreases and an image quality is excellent.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illuminating apparatus providing polarized color light, the apparatus comprising:
   a light source;
   a polarization light guide plate unit which converts a polarization direction of light emitted from the light source into linearly polarized light and collimates the linearly polarized light; and
   a cholesteric liquid crystal color filter, disposed on an upper portion of the polarization light guide plate unit, which selectively reflects light incident thereon from the polarization light guide plate unit according to a polarized status and a wavelength of the light from the polarization light guide plate unit;
   wherein the polarization light guide plate unit comprises:
      a light guide plate which guides light emitted from the light source;
      a collimating member which is disposed on an upper portion of the light guide plate, the collimating member comprising a plurality of reflective patterns, each of the reflective patterns comprising an inclined surface, which reflects upward light emitted from the light guide plate; and
      a plurality of polarization separating layers, each disposed between one of the plurality of reflective patterns and the light guide plate, which receive light incident thereon from the light guide plate and transmit light having a first polarization and reflect light having a second polarization, orthogonal to the first polarization,
      wherein the plurality of polarization separating layers are disposed on only those portions of the upper surface of the light guide plate which directly face the plurality of reflective patterns and are not disposed on the portions of the upper surface of the light guide plate between the reflective patterns.

2. The apparatus of claim 1, further comprising:
   a first polarization changing member which is disposed between the cholesteric liquid crystal color filter and the polarization light guide plate unit, and changes linearly-polarized light incident thereon from the polarization light guide plate unit into circularly-polarized light; and
   a second polarization changing member which is disposed on an upper portion of the cholesteric liquid crystal color filter, and changes the circularly-polarized light incident thereon from the cholesteric liquid crystal color filter into linearly-polarized light.

3. The apparatus of claim 1, wherein each of the reflective patterns have a polyhedral shape.

4. The apparatus of claim 1, wherein the polarization separating layer comprises a stack of a plurality of thin films having different refractive indices.

5. The apparatus of claim 1, wherein the polarization separating layer comprises a plurality of alternating first and second thin films, wherein the first thin films have a different refractive index from the second thin films.

6. The apparatus of claim 1, wherein a slope of the inclined surface of each of the reflective patterns of the collimating member is such that an angle between light that is reflected from the inclined surface and exits through an upper surface of the collimating member and a line normal to the upper surface is between about −10° and +10°.

7. The apparatus of claim 1, wherein the plurality of reflective patterns are arranged in one or two-directional arrays.

8. The apparatus of claim 1, further comprising:
   a reflective plate disposed on a side portion of the light guide plate.

9. The apparatus of claim 8, further comprising a third polarization changing member disposed between the light guide plate and the reflective plate.

10. The apparatus of claim 1, further comprising a fourth polarization changing member disposed on a lower surface of the light guide plate.

11. The apparatus of claim 1, wherein each of the thin films in the polarization separating layer is formed of one selected from the group consisting of $Al_2O_3$, $CeO_2$, $Ta_2O_5$, $TiO_2$, ZnS, $ZrO_2$, $CaF_2$, and $MgF_2$.

12. The apparatus of claim 1, further comprising an adhesion layer comprising a material having a refractive index less than that of the light guide plate, and disposed between the light guide plate and the polarization separating layer.

13. The apparatus of claim 1, wherein the polarization light guide plate unit comprises:
   a light guide plate which guides the light emitted from the light source;
   a collimator which is disposed on a side portion of the light guide plate that is adjacent to the light source, and decreases an incident angle of incident onto the light guide plate;
   an anisotropic layer which is disposed on a lower portion of the light guide plate the anisotropic layer comprising an anisotropic material having a refractive index which varies according to a polarization direction of light; and
   a first light exiting layer which is disposed on a lower portion of the anisotropic layer, the first light exciting layer comprising a plurality of first light exiting patterns which reflect light transmitted through the anisotropic layer toward the upper portion of the light guide plate.

14. The apparatus of claim 13, wherein the collimator comprises:
   a plurality of reflective mirrors, each having a trapezoidal shape with a narrower side adjacent to the light source and a wider side adjacent to the light guide plate, and facing each other; and
   a triangle prism which is disposed between the plurality of reflective mirrors that are facing each other, and has a bottom surface facing the light source and a corner opposite to the bottom surface facing the light guide plate.

15. The apparatus of claim 13, wherein the first light exiting pattern is a prism pattern.

16. The apparatus of claim 13, wherein the light exiting patterns are arranged in a one-dimensional array along a first direction.

17. The apparatus of claim 16, further comprising a second light exiting layer comprising second light exiting patterns disposed on the light guide plate.

18. The apparatus of claim 17, wherein the second light exiting patterns are arranged in one-dimensional array along a second direction that is perpendicular to the first direction.

19. The apparatus of claim 13, further comprising:
   a reflective plate disposed on a side of the light guide plate.

20. The apparatus of claim 19, further comprising a third polarization changing member disposed between the light guide plate and the reflective plate.

21. A display apparatus comprising:
   an illuminating apparatus; and a display panel which displays images using light emitted from the illuminating apparatus;

wherein the illuminating apparatus comprises a light source;

a polarization light guide plate unit which converts a polarization direction of light emitted from the light source into linearly polarized light and collimates the linearly polarized light; and a cholesteric liquid crystal color filter, disposed on an upper portion of the polarization light guide plate unit, which selectively reflects light incident thereon from the polarization light guide plate unit according to a polarized status and a wavelength of the light from the polarization light guide plate unit;

wherein the polarization light guide plate unit comprises:

a light guide plate which guides light emitted from the light source;

a collimating member which is disposed on an upper portion of the light guide plate, the collimating member comprising a plurality of reflective patterns, each of the reflective patterns comprising an inclined surface, which reflects upward light emitted from the light guide plate; and a plurality of polarization separating layers, each disposed between one of the plurality of reflective patterns and the light guide plate, which receive light incident thereon from the light guide plate and transmit light having a first polarization and reflect light having a second polarization, orthogonal to the first polarization, wherein the plurality of polarization separating layers are disposed on only those portions of the upper surface of the light guide plate which directly face the plurality of reflective patterns and are not disposed on the portions of the upper surface of the light guide plate between the reflective patterns.

* * * * *